E. S. PILLSBURY.
ELECTRIC MOTOR.
APPLICATION FILED MAY 14, 1910.

973,878.

Patented Oct. 25, 1910.

2 SHEETS—SHEET 1.

Witnesses:
John Enders
Henry A. Parks

Inventor:
Edwin S. Pillsbury,
By Sheridan, Wilkinson, Scott & Richmond
Attys

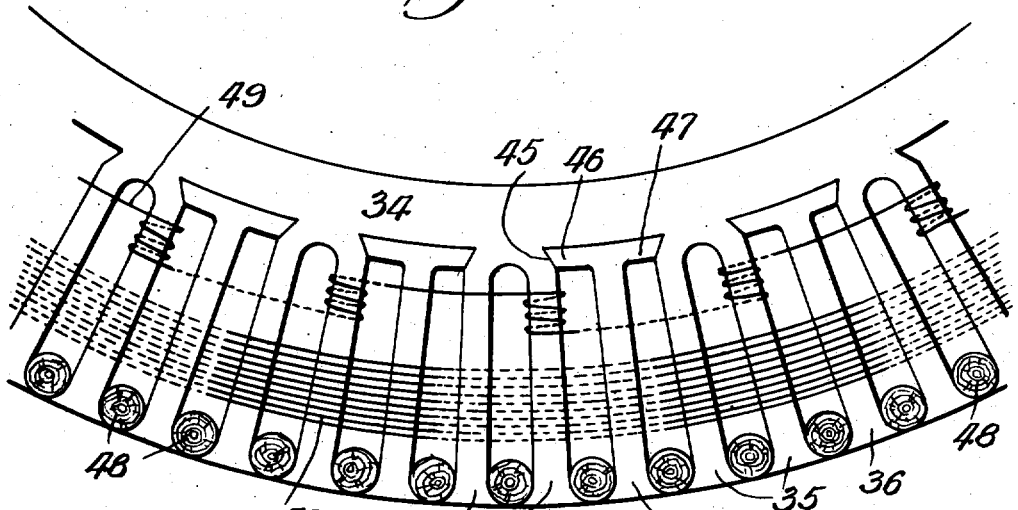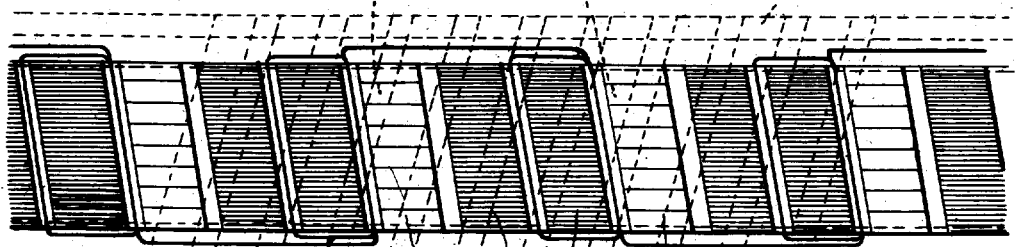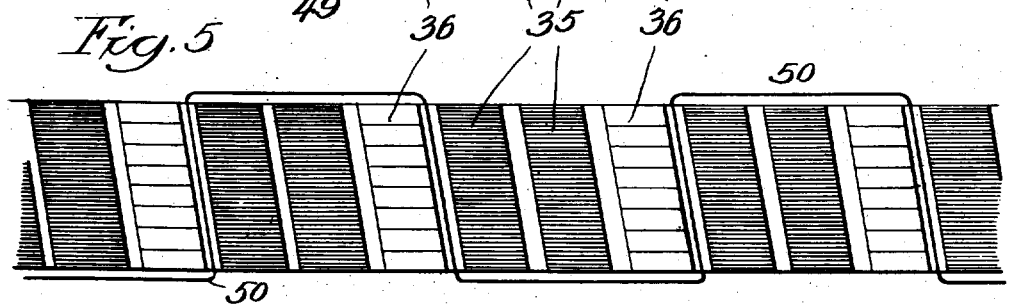

UNITED STATES PATENT OFFICE.

EDWIN S. PILLSBURY, OF ST. LOUIS, MISSOURI, ASSIGNOR TO CENTURY ELECTRIC COMPANY, A CORPORATION OF MISSOURI.

ELECTRIC MOTOR.

973,878.   Specification of Letters Patent.   Patented Oct. 25, 1910.

Application filed May 14, 1910. Serial No. 561,332.

*To all whom it may concern:*

Be it known that I, EDWIN S. PILLSBURY, a citizen of the United States, residing at St. Louis, State of Missouri, have invented certain new and useful Improvements in Electric Motors, of which the following is a specification.

The principal object of my invention is to provide a new and improved dynamo electric machine having a laminated field magnet structure so disposed as to give a starting torque when energized with single phase alternating current, that is, when the current flows through a single energizing circuit.

Another object of my invention is to provide a single phase alternating current electric motor with a laminated field magnet structure, the thickness of the laminæ being different at different parts and so disposed that a starting torque shall be exerted upon the armature.

These and various other objects will be made apparent in the following specification and claims, when taken in connection with the accompanying drawings.

In these drawings, I have by way of example illustrated one specific embodiment of my invention, but the invention will be understood to be defined in the appended claims.

Figure 1:
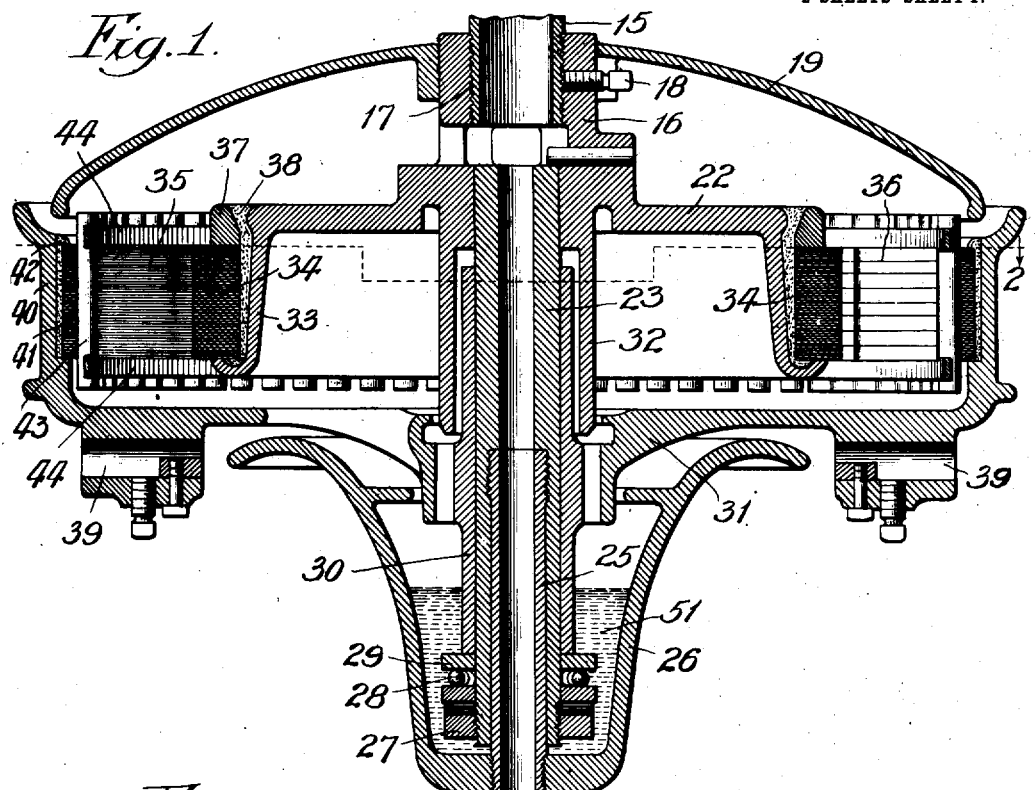
Figure 2:
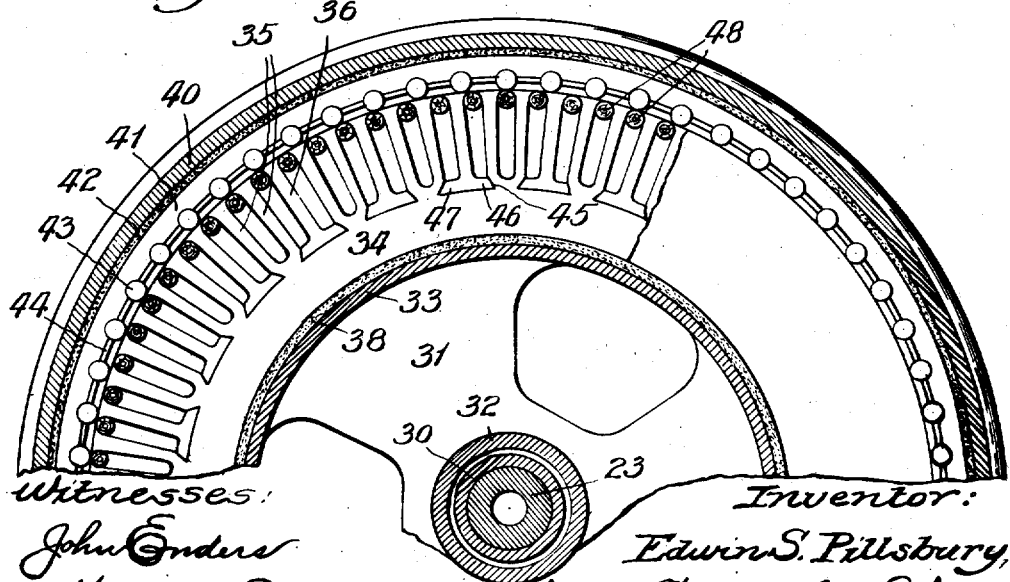

Referring to the drawings Figure 1 is a vertical section of an alternating current ceiling fan motor so constructed as to embody my invention. Fig. 2 is a horizontal section thereof, taken on the line 2 in Fig. 1 looking down. Figs. 3, 4 and 5 are enlarged details showing the field magnet laminations and with the windings diagrammatically indicated thereon.

The motor is suspended from the ceiling by the tubular member 15, to the bottom end of which the field magnet spider 22 is secured by means of the boss 16 engaging the screw threads 17. The set screw 18 serves as an additional means to secure the parts in fixed relation. The boss 16 supports the top shield or cover 19. Depending from the boss 16 and rigidly united therewith and to the spider 22 is the column 23 which has an extension tubular member 25 on its lower end. This extension member 25 has screw threaded engagement with the oil well 26, thus supporting the latter. The depending column 23 has a screw threaded nut 27 on its lower end which supports the stationary ball bearing member, the balls of which are indicated by the reference number 28. On these balls 28 rests the coacting movable ball bearing member 29 which supports the rotatable sleeve 30, fitting around the column 23. This rotatable sleeve 30 is an integral part of the spider 31 which carries the cylindrical armature frame 40 on its periphery. The sleeve 32 depends in fixed position from the spider 22, surrounding the upper end of the rotatable sleeve 30 and being spaced therefrom. Thus any of the oil 51, surrounding the ball bearings in the cup 26, which may work up between the stationary column 23 and the surrounding rotatable sleeve 30, will be directed downwardly by the fixed outer sleeve 32 and will pass back through the openings in the rotatable spider 31.

The fixed spider 22 has a seat 33 designated generally by the reference numeral 34, to receive the field magnet laminæ. These are secured in place by means of the clamping ring 37 and solder 38. The field magnet laminæ 34 have part of the pole teeth 35 punched integral therewith, the remainder of the pole teeth 36 being of greater thickness and separable from the others, as will be described later.

The sockets to receive the fan blades are represented by the reference numeral 39.

The cylindrical armature frame 40 holds the armature laminæ 41 secured in place by solder 42. The slots in the armature are occupied by the copper bars 43 of the usual squirrel cage armature, the end rings of which are indicated by the reference numeral 44.

Referring now more particularly to Figs. 3, 4 and 5, it will be seen that two adjacent teeth 35 are composed of laminæ that are integral with the main field magnet stampings 34, and of course of the same thickness therewith; but it will be seen that every third tooth 36 is made of thicker stock and that in punching the laminæ 34 spaces are left so that when these teeth 36 are built up in place, they will correspond in dimensions with the other teeth 35. The space left in the stampings 34 to receive the thick teeth 36 is slightly undercut at each side, as indicated by the reference numeral 45, and the thick laminæ 36 have corresponding toes 46 adapted to slip into these undercut places.

In other words, the thick teeth 36 are dovetailed into place. After the windings have been applied, wooden plugs 48 are driven between the tips of adjacent field magnet teeth to brace them properly. After the laminæ have been completely assembled, a winding 49 is applied, going about twenty-five times around every third tooth, these teeth being of thin metal. This winding goes around the teeth referred to in series and goes around in opposite directions on consecutive teeth. Next, a wave winding 50 is applied in series with the aforementioned winding 49. This wave winding embraces three teeth in each bight thereof and is applied around the entire field structure about seventy-five times. It is so disposed that of the three teeth in a bight the previously wound teeth will be the center ones and the thicker teeth 36 will always be at one side. Of course, this winding is in such direction that the magneto motive force thereof acts with instead of against that of the winding 49.

The field and armature slots make slight angles with a direction parallel to the axis of the motor. This is shown in Fig. 4, which is a face view of the field poles, the position of the armature pole teeth being shown in dotted lines.

It will be observed that the three teeth included in one bight of the wave winding 50 are subjected to the same magneto motive force by that winding and that the middle tooth 35 is subject to an extra magneto motive force due to the winding 49,—thus an approach to a sine form for the distribution of magnetism in the field is produced. It will further be observed that the tooth on one side of the center tooth which carries the windings 49 is of thin stock, while the tooth on the other side is of thick stock; thus each pole made up of three teeth is not symmetrical in structure, but the tooth at one side is of thicker laminæ than at the other side.

I have demonstrated by actual trial that when the winding 49, 50 is supplied with a single phase alternating current a starting torque will be exerted on the short circuited armature 43, 44.

I claim:

1. In a device of the class described, a laminated field pole, the thickness of the individual laminæ being different on two sides thereof.

2. In a device of the class described, a laminated slotted field pole, the thickness of the individual laminæ being different on opposite sides of the slot.

3. In a device of the class described, a laminated field pole comprising a plurality of teeth, the teeth at one side thereof being of thicker laminæ than the tooth at the opposite side.

4. In a device of the class described, a laminated field magnet having a plurality of teeth to each pole, part of the teeth being composed of integral projections from the field magnet laminæ, and other teeth being separate therefrom and of laminæ having a different thickness.

5. In a device of the class described, a laminated field magnet, each field magnet pole having a plurality of teeth, the field magnet being made up of stampings having part of the teeth integral therewith and having spaces left for other teeth, these spaces being filled with teeth built up from laminæ of a different thickness from the others.

6. In a device of the class described, a laminated field magnet having part of the teeth integral therewith and having spaces left for other teeth, these spaces being undercut and the said other teeth being adapted to engage the undercut places.

7. In a device of the class described, a laminated field magnet having a plurality of teeth, every third tooth being built up from laminæ of different thickness, and the remaining teeth being integral projections from the field magnet.

8. In a device of the class described, a laminated field magnet having a plurality of teeth, every third tooth being built up from laminæ of different thickness, and the remaining teeth being integral projections of the field magnet, corresponding ones of each pair of integral teeth being wound with a series winding, and a wave winding superposed on the teeth by threes, each already mentioned series wound tooth being the center of a respective group of three.

9. In a device of the class described, a laminated field magnet having a plurality of teeth to each pole, part of said teeth being integral with the laminated field magnet and other teeth being composed of separate laminæ, and dovetailed joints between said other teeth and the field magnet, said other teeth being built up of laminæ of a different thickness from the laminæ of the field magnet.

10. In a device of the class described, a laminated field pole comprising a large number of thin laminæ on one side and a less number of thick laminæ on the other side, the aggregate thickness of the laminæ on each side being substantially the same.

11. In a device of the class described, a laminated slotted field pole, and field magnet windings in the slots thereof, the thickness of the individual laminæ being different on opposite sides of the slot.

In testimony whereof, I have subscribed my name.

EDWIN S. PILLSBURY.

Witnesses:
John Hercet,
Santer M. Jones.